Dec. 6, 1932.    A. J. WEATHERHEAD, JR    1,890,348
FASTENING DEVICE
Filed Aug. 1, 1929
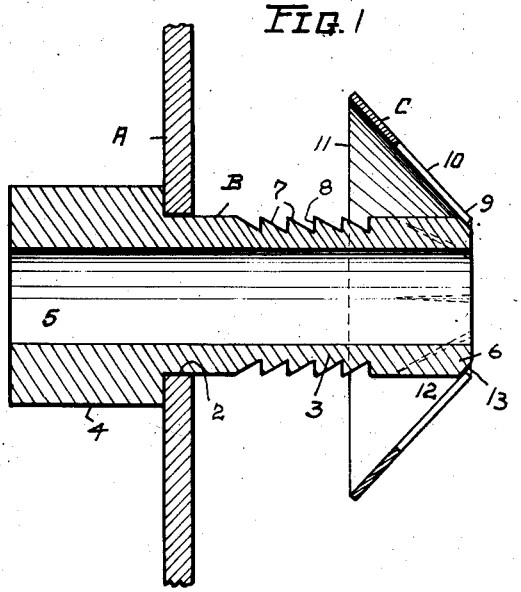
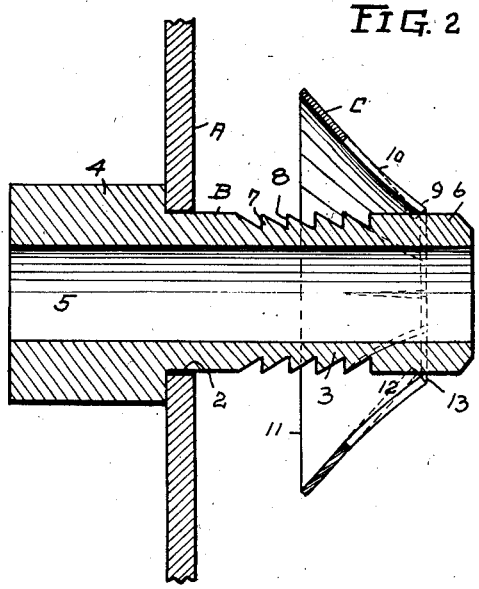
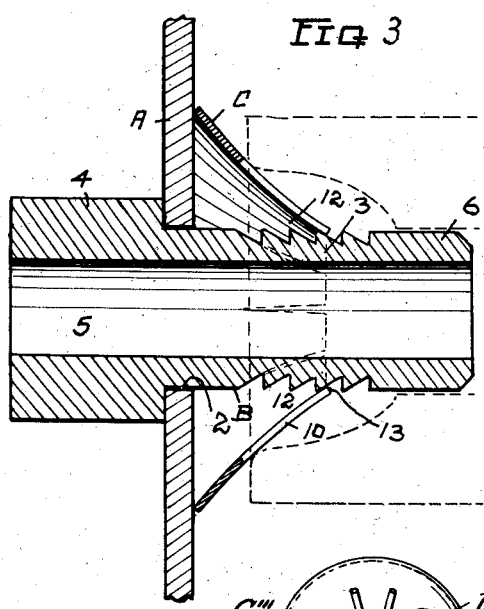
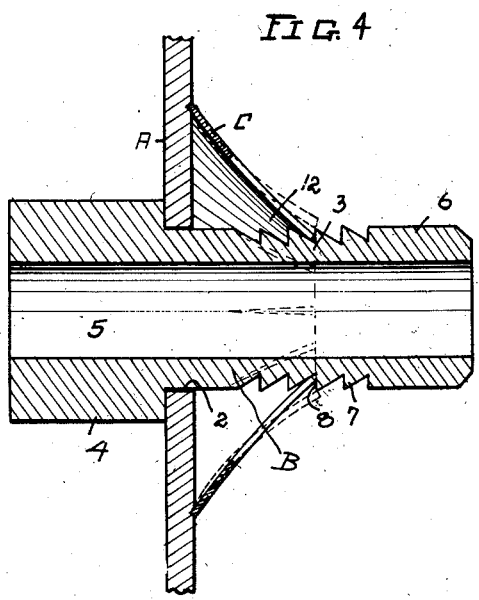
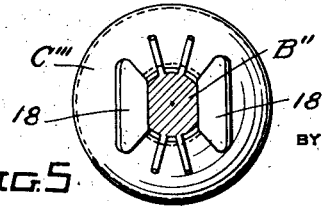
INVENTOR
A. J. WEATHERHEAD JR.
BY
Fisher, Moser + Moore
ATTORNEY Patented Dec. 6, 1932

1,890,348

UNITED STATES PATENT OFFICE

ALBERT J. WEATHERHEAD, JR., OF CLEVELAND, OHIO

FASTENING DEVICE

Application filed August 1, 1929. Serial No. 382,623.

This invention relates to fasteners and connections and my primary aim is to provide an exceedingly simple and effective fastening and connecting device which may be used in lieu of a screw-threaded nut or like fastening means for bolts, tubes, pipes, and other cylindrical pieces or parts. Nuts are admittedly cheap and effective when used as customarily to fasten parts together, but my fastener is less costly than a nut and may be used as effectively or better in many instances, especially in machines and appliances where the cost and weight of materials and the cost of labor must be seriously considered, or where the parts are subjected to vibration and liable to loosen or separate: For example, in automobiles and aeroplanes it is frequently desirable to use an effective fastener at a low cost, or to make a connection quickly to reduce assemblying costs, and/or to fasten parts which are not to be disconnected necessarily but which on the contrary are intended to be secured tightly and permanently together. These and other objects are all embodied in my invention which stated briefly and more specifically consists of a spring cone and fastening parts constructed and arranged substantially as hereinafter shown and described and more particularly pointed out in the claim.

Thus, a preferred embodiment of the invention is shown in Figs. 1 to 4, inclusive, which figures are enlarged sectional views of a cone fastener being applied to a notched tube extending through a supporting plate.

Thus, Fig. 1 is a sectional view showing the spring cone in place preliminary to sleeving it over the end of the tube. Fig. 2 is a similar view to Fig. 1, showing the cone pressed partway and expanded over the end of the tube; Fig. 3 a similar view showing the cone carried against the supporting plate; and Fig. 4 a similar view showing the cone in dotted lines as it appears before it is compressed and flexed, and in full lines in its reflex wedging and locking position.

Fig. 5 is an end view partly in section of a modified form of fastening cone.

A simple exemplification of the invention is presented in the drawing, consisting of a supporting part or plate A, a cylindrical body B mounted upon and projecting through said plate A, and a conical shell C adapted to interlock body B and plate A together with spring clamping effect. Plate A and body B are merely representative of different pieces or parts which may be fastened together by the spring shell or cone C, but as delineated plate A is formed with an opening 2, and body B has a prolongation 3 of reduced diameter adapted to project through said opening. Body B is also formed with an enlargement or shoulder 4 adapted to abut or bear against one side of the plate, and is in the present instance, a tubular member, or a body provided with an axial bore 5 within which a rod or shaft may have slidable or rotatable bearing, or which may be utilized in other ways.

The cylindrical prolongation 3 is chamfered at its extremity 6 and grooved or ribbed over a portion of its cylindrical surface back from this extremity. Thus a series of annular teeth, ribs or serrations 7 are provided upon the outside of prolongation 3 and the locking portions 8 of these teeth extend at an abrupt or right angle to the axis of body A. The other side or sides of the teeth may be formed variously, for example, inclined forwardly toward the axis of body B at an angle corresponding to the angular sides of cone C or at a more acute angle in respect thereto, thereby promoting or influencing the contracting or flexing movements of the apicular locking portions 9 of the cone. Shell C is in the form of a frustrum and made of relatively thin sheet steel, brass or other metal possessing spring properties, and the truncated end is split radially or divided by slits 10 extending a substantial distance toward the base edge 11 of the shell. A series of spring locking tongues 12 of convexly curved shape are therefore present in the smaller end of the conical shell, and the vertex opening is of slightly smaller diameter than the outer diameter of the prolongation 3 of body B. Accordingly, when the conical shell C is sleeved over the chamfered extremity of body B the tongues 12 will yield and flex outwardly on curved lines, see Figs. 1 and 2, with the greatest degree of resiliency at the base of the tongues where the arc of curvature is greater than at the truncated end edges of the shell. Moreover, to effect springing of the shell in substantial degree, a hollow circular pressure-applying tool is brought into contact with shell C at the base of the spring tongues and apart from the locking tip portions thereof. Thus, in applying pressure annularly to the conical shell, say at a point midway of the sides between the truncated edge 13 and base edge 11 the shell is forced lengthwise over body B and the spring tongues 12 flexed or buckled on curved lines. The inherent spring tendency in the thin metal wall of the shell is to straighten the tongues when the end pressure on the shell is relieved, and the effect is to lengthen the tongues or rather to restore them to their original length. In other words, buckling of the shell foreshortens it, and its inherent spring properties will straighten and restore it to its original length providing nothing interferes. In the present assembly of parts the shell is not permitted to resume its original form but is caused to engage one of the annular teeth with spring locking effect after the base of the shell is seated tightly against plate A.

When the shell seats squarely against plate A and locks squarely against body B the truncated end and the base portion lie in parallel planes at right angles to the axis of the shell, and the annular teeth 7 on body B present a continuous locking abutment in a plane at right angles to the axis of the shell. The truncated edge of the shell engages the prolongation 3 at a remote point from plate A, and the base edge of the shell engages the base part or plate A remotely from the attached part of body B, depending upon the length and diameter of the shell.

A desirable shell to use is one in which the side wall is made of thin tempered steel inclined at or about thirty-seven and one-half degrees and up to forty-five degrees relatively to the axis of body B, to provide substantial bracing results and to produce a thrust movement axially to the body when the buckled walls of the shell return to a straight position and jamb the truncated end edges of the shell against the locking portions of the teeth.

In Fig. 5 I show a spring cone C''' having areas 18 therein removed or cut out to more readily permit disconnection of any elongated member B'' having flattened side portions and interlocked with the cone-shaped member by merely turning either the elongated member or the cone-shaped member.

What I claim, is:

A fastening device including an elongated member having its circular wall flattened at opposite sides, and a shell made of thin spring metal in the form of a truncated straight sided cone, the wall of said cone having at opposite ends sharp edges and being slit and partly cut away at symmetrical areas at the truncated end of said cone to provide oppositely arranged groups of yielding fingers separated by recessed portions in the wall of said cone engaging the circular wall portions of said elongated member and adapted to be released from said circular wall portions by rotation of said shell with respect thereto such that the circular portions of the bolt lie in said recessed portions.

In testimony whereof I affix my signature.

ALBERT J. WEATHERHEAD, Jr.